United States Patent
Tsutsui et al.

(10) Patent No.: US 11,214,369 B2
(45) Date of Patent: Jan. 4, 2022

(54) SYSTEM, CONTROL DEVICE, AND MODULE

(71) Applicant: HAPSMobile Inc., Tokyo (JP)

(72) Inventors: Tatsushi Tsutsui, Tokyo (JP); Koji Kusunoki, Tokyo (JP); Akihiro Baba, Tokyo (JP); Naoyoshi Hashimoto, Tokyo (JP); Osamu Kamimura, Tokyo (JP); Nobuyuki Uetsuki, Tokyo (JP); Hiroshi Otake, Tokyo (JP); Ayako Sato, Tokyo (JP); Chie Hirosawa, Tokyo (JP)

(73) Assignee: HAPSMobile Inc., Tokyo (JP)

( * ) Notice: Subject to any disclaimer, the term of this patent is extended or adjusted under 35 U.S.C. 154(b) by 0 days.

(21) Appl. No.: 17/206,102

(22) Filed: Mar. 18, 2021

(65) Prior Publication Data
US 2021/0253243 A1     Aug. 19, 2021

Related U.S. Application Data

(63) Continuation of application No. PCT/JP2019/029910, filed on Jul. 30, 2019.

(30) Foreign Application Priority Data

Sep. 21, 2018 (JP) .............................. JP2018-177603

(51) Int. Cl.
*B64C 39/02* (2006.01)
*B64C 39/10* (2006.01)
(Continued)

(52) U.S. Cl.
CPC ............ *B64C 39/024* (2013.01); *B64C 39/10* (2013.01); *H04B 7/18513* (2013.01);
(Continued)

(58) Field of Classification Search
CPC ........ B64C 2201/028; B64C 2201/066; B64C 2201/146; B64C 39/024; B64C 39/10;
(Continued)

(56) References Cited

U.S. PATENT DOCUMENTS 10,793,269 B2 * 10/2020 Abeles ...................... G06T 7/73
2003/0141409 A1 * 7/2003 Lisoski ..................... B64C 3/42
244/13

(Continued)

FOREIGN PATENT DOCUMENTS

JP     2002211496 A     7/2002
JP     2003092545 A     3/2003
(Continued)

OTHER PUBLICATIONS (ISA/237) Written Opinion of the International Search Authority for International Patent Application No. PCT/JP2019/029910, mailed by the Japan Patent Office dated Oct. 1, 2019.
(Continued)

*Primary Examiner* — Tan H Trinh

(57) ABSTRACT

There is provided a system including: a control device mounted on an aircraft and configured to control the aircraft, the aircraft having a battery, and a wireless device configured to use power stored in the battery to provide a wireless communication service to a user terminal; and a module that is physically attachable to and detachable from the control device, in which the control device has a housing that includes a module attachment and detachment unit, and an electrical connection unit configured to electrically connect the module to the battery when the module is attached to the module attachment and detachment unit, and the module has, a power receiving unit configured to receive power from the battery, and a communication processing unit configured
(Continued)

to use the power received by the power receiving unit to communicate with the wireless device.

19 Claims, 6 Drawing Sheets

(51) Int. Cl.
  *H04B 7/185* (2006.01)
  *H04W 52/02* (2009.01)
  *H04B 7/204* (2006.01)
(52) U.S. Cl.
  CPC ..... *H04B 7/18517* (2013.01); *H04B 7/18523* (2013.01); *H04B 7/18543* (2013.01); *H04W 52/0274* (2013.01); *B64C 2201/028* (2013.01); *B64C 2201/066* (2013.01); *B64C 2201/146* (2013.01); *B64D 2211/00* (2013.01); *B64D 2221/00* (2013.01); *H04B 7/2041* (2013.01)
(58) Field of Classification Search
  CPC ............ B64D 2211/00; B64D 2221/00; H04B 7/18513; H04B 7/18517; H04B 7/18523; H04B 7/18543; H04B 7/2041; H04B 52/0274
  USPC ....... 455/41.1, 41.2, 297, 573, 575.1, 575.6; 244/13; 701/3
  See application file for complete search history.

(56) References Cited

U.S. PATENT DOCUMENTS

| | | | | |
|---|---|---|---|---|
| 2009/0069957 | A1* | 3/2009 | Nakamura | G05D 1/0094 701/3 |
| 2017/0036771 | A1* | 2/2017 | Woodman | B64C 25/54 |
| 2017/0069214 | A1* | 3/2017 | Dupray | G08G 5/0013 |
| 2018/0039272 | A1* | 2/2018 | Seydoux | G05D 1/101 |
| 2018/0067493 | A1* | 3/2018 | Pilskalns | G05D 1/0011 |
| 2018/0166779 | A1  | 6/2018 | Feria | |
| 2018/0245365 | A1* | 8/2018 | Wankewycz | E04H 6/44 |
| 2019/0086463 | A1* | 3/2019 | Herlihy | B64C 39/024 |
| 2019/0228505 | A1* | 7/2019 | Douady-Pleven | H04N 5/2328 |
| 2019/0250601 | A1* | 8/2019 | Donahoe | G05D 1/101 |
| 2019/0256221 | A1* | 8/2019 | Yang | H04N 5/2354 |
| 2019/0289512 | A1* | 9/2019 | Kaneda | B64C 39/024 |
| 2019/0300156 | A1* | 10/2019 | Suzuki | B64D 31/00 |
| 2020/0062383 | A1* | 2/2020 | Kim | B64C 3/385 |
| 2020/0287619 | A1* | 9/2020 | Tavner | G05D 1/0022 |
| 2021/0011492 | A1* | 1/2021 | Raabe | B64D 1/22 |
| 2021/0020054 | A1* | 1/2021 | Tachiiwa | B64F 1/222 |
| 2021/0034056 | A1* | 2/2021 | Griffin | G06K 9/0063 |
| 2021/0206491 | A1* | 7/2021 | Wenger | G05D 1/0022 |
| 2021/0237901 | A1* | 8/2021 | von Flotow | B64C 39/024 |

FOREIGN PATENT DOCUMENTS

| | | |
|---|---|---|
| JP | 2003522509 A | 7/2003 |
| JP | 2014116850 A | 6/2014 |
| JP | 2018127201 A | 8/2018 |

OTHER PUBLICATIONS

Decision to Grant a Patent issued for counterpart Japanese Application No. 2018-177603, issued by the Japanese Patent Office dated Jan. 28, 2020 (drafted on Jan. 24, 2020).

Extended European Search Report for counterpart European Application No. 19861829.0, issued by the European Patent Office dated Oct. 25, 2021.

Sudha et al: "Experimental studies for enhancing endurance of unmanned air vehicles", 2017 International Conference On Electrical, Electronics, Communication, Computer, and Optimization Techniques (ICEECCOT), IEEE, Dec. 15, 2017 (Dec. 15, 2017), pp. 216-219, XP033317455, DOI:10.1109/CEECCOT.2017.8284670, ISBN: 978-1-5386-1205-7, retrieved on Feb. 7, 2018.

Naqvi Syed Ahsan Raza et al: "Drone-Aided Communication as a Key Enabler for 5G and Resilient Public Safety Networks", IEEE Communications Magazine, IEEE Service Center, Piscataway, US, vol. 56, No. 1, Jan. 1, 2018 (Jan. 1, 2018), pp. 36-42, XP011675835, ISSN: 0163-6804, DOI: 10 1109/MCOM. 2017.1700451, retrieved on Jan. 11, 2018.

Yiming Huo et al: "Distributed and Multi-layer UAV Network for the Next-generation Wireless Communication", Arxiv.Org, Cornell University Library, 201 Olin Library Cornell University Ithaca, NY14853, May 3, 2018 (May 3, 2018), XP080885540.

* cited by examiner

SYSTEM, CONTROL DEVICE, AND MODULE

The contents of the following Japanese and PCT applications are incorporated herein by reference:
NO. 2018-177603 filed in JP on Sep. 21, 2018 and
NO. PCT/JP2019/029910 filed in WO on Jul. 30, 2019.

BACKGROUND

1. Technical Field

The present invention relates to a system, a control device, and a module.

2. Related Art

An aircraft having an antenna and flying in the stratosphere to provide a stratospheric platform is known (refer to, for example, Patent Document 1).

CITATION LIST

Patent Document

[Patent Document 1] Japanese Patent Application Publication No. 2002-211496

Technical Problem

It is desirable to provide a technology capable of diversifying a service which is available by an aircraft such as a stratospheric platform.

DESCRIPTION OF EXEMPLARY EMBODIMENTS

Hereinafter, the invention will be described through embodiments of the invention, but the following embodiments do not limit the invention according to claims. Further, not all the combinations of features described in the embodiments are essential for means to solve the problem in the invention.

Figure 1:
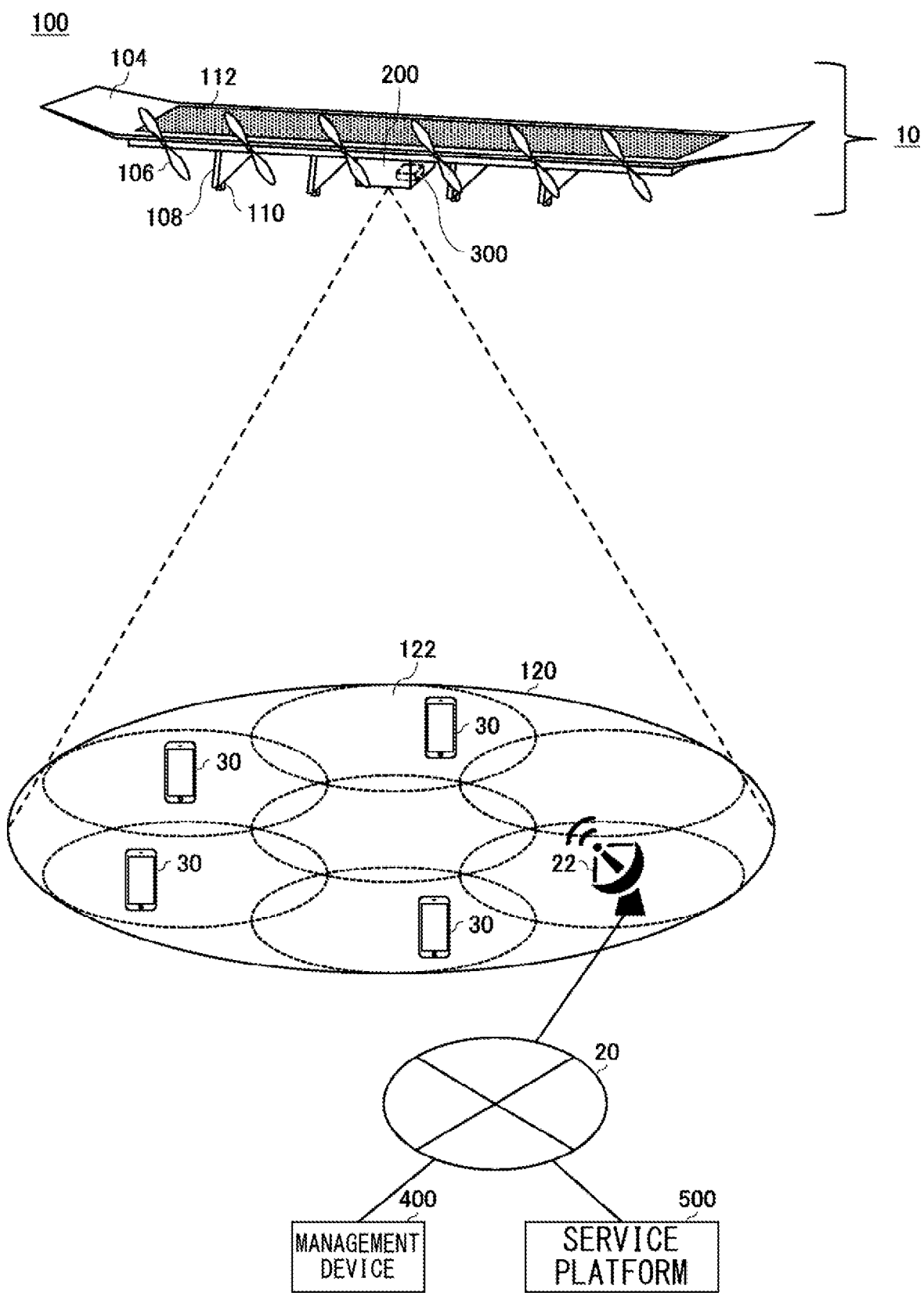
FIG. 1 schematically shows an example of a system 10.

FIG. 1 schematically shows an example of a system 10. The system 10 according to the present embodiment includes an aircraft 100, and a module 300 that is attachable to and detachable from the aircraft 100.

The aircraft 100 includes a main wing unit 104, a propeller 106, a skid 108, a wheel 110, a solar panel 112, and a control device 200. The control device 200 controls flight of the aircraft 100. The aircraft 100 includes a battery and a wireless device (not shown). The battery and the wireless device are, for example, accommodated inside a housing of the control device 200.

The battery stores power generated by the solar panel 112. The aircraft 100 can fly by using the power stored in the battery to rotate the propeller 106. Further, the aircraft 100 forms a communication area 120 on the ground by the wireless device, and provides a wireless communication service to a user terminal 30 in the communication area 120. An antenna may be, for example, a multibeam antenna. The communication area 120 may be constituted by a single cell. Further, the communication area 120 may be constituted by a plurality of sub-cells 122. For example, the aircraft 100 flies in the stratosphere and provides the wireless communication service to the user terminal 30 on the ground. The aircraft 100 may function as a stratospheric platform.

The user terminal 30 may be any terminal as long as the terminal is a communication terminal capable of communicating with the aircraft 100. The user terminal 30 is, for example, a mobile phone such as a smartphone. The user terminal 30 may be a tablet terminal, a PC (Personal Computer), and the like.

The aircraft 100 provides, for example, the wireless communication service to the user terminal 30 by relaying communication between the user terminal 30 and a network 20 on the ground. The network 20 may include a core network provided by a telecommunications operator. The network 20 may also include the Internet.

The aircraft 100 may communicate with the network 20 via a ground station 22 in the communication area 120 among ground stations 22 arranged in various places on the ground. The aircraft 100 may also communicate with the network 20, for example, via a communications satellite (not shown).

For example, the aircraft 100 transmits data received from the user terminal 30 in the communication area 120 to the network 20. Further, for example, when the aircraft 100 receives data addressed to the user terminal 30 in the communication area 120 via the network 20, the aircraft 100 transmits the data to the user terminal 30.

The aircraft 100 may be controlled by a management device 400 on the ground. The aircraft 100 flies, for example, according to an instruction transmitted by the management device 400 via the network 20 and the ground station 22. The management device 400 may transmit the instruction to the aircraft 100 via a communications satellite (not shown).

The management device 400 controls the aircraft 100 by transmitting the instruction. The management device 400 may cause the aircraft 100 to circle over a target area so that the communication area 120 covers the target area on the ground. The aircraft 100 circling over the target area in order to cover the target area may be described as a fixed point flight. The management device 400 may cause the aircraft 100 to make the fixed point flight for each of a plurality of target areas to cover each of the plurality of target areas.

The management device 400 may be able to acquire information relating to the wireless communication service provided by the aircraft 100 to the user terminal 30. For example, the management device 400 acquires communication traffic information which indicates communication traffic in the wireless communication services provided by the aircraft 100 to a plurality of user terminals 30. The management device 400 acquires, for example, the communication traffic information from a device in a core network of the telecommunications operator that is a provider providing the wireless communication service to the user terminal 30.

The management device 400 may also receive the communication traffic information from the aircraft 100. Further, the management device 400 may monitor the communication in the wireless communication services provided by the aircraft 100 to the plurality of user terminals 30.

The control device 200 has a space in which the module 300 can be mounted. The control device 200 may include a housing including a module attachment and detachment unit to and from which the module 300 is physically attachable and detachable. The module attachment and detachment unit has, for example, a shape of a recess into which the module 300 can be inserted. In the module attachment and detachment unit, an electrical connection unit that is capable of electrically connecting the module 300 to the battery of the aircraft 100 may be arranged. For example, when the module 300 is attached to the module attachment and detachment unit, the electrical connection unit comes in contact with an electrical connection unit of the module 300, so that the control device 200 and the module 300 are electrically connected to each other.

The module 300 may be any module that performs processing by using the power supplied from the battery of the control device 200. The module 300 may be, for example, a sensor module. An example of the sensor module includes a camera for capturing an image of the ground from the air where the aircraft 100 flies, a camera for capturing an image of the sky where the aircraft 100 flies, and a camera for capturing an image of the higher sky from the air where the aircraft 100 flies, a cosmic X-ray sensor, an ultraviolet sensor, a temperature sensor, a wind direction sensor, a wind speed sensor, a pressure sensor, an ozone level sensor, and a chemical analysis device, and the like. The module 300 may be a module other than the sensor module. For example, the module 300 may be a storage module for storing data, a launching device for launching a small rocket, a laser rangefinder, a launching device for a meteorological sonde or the like, a module for edge computing, and the like.

The module 300 may be able to communicate with the control device 200 by using the power supplied from the battery of the aircraft 100. The module 300 includes, for example, an antenna, and communicates with the control device 200 via the antenna and an antenna of the control device 200. Further, when connection terminals are arranged in each of the module 300 and the module attachment and detachment unit, and the module 300 is attached to the module attachment and detachment unit, the module 300 and the control device 200 may be connected to each other in a wired manner by the connection terminals being connected to each other.

The module 300 may be, for example, standardized, and the standard-compliant module 300 may be attachable to and detachable from the control device 200. For example, the module 300 selected from a plurality of types of modules 300 according to needs is mounted on the aircraft 100 on the ground. The number of the modules 300 that can be mounted on the aircraft 100 may be one, or may be two or more. Further, one module 300 may be equipped with a plurality of functions. On the ground, the module 300 is mounted on the aircraft 100, and the aircraft 100 moves to the sky, and then the module 300 executes various types of processing. When the aircraft 100 is a stratospheric platform, the module 300 can realize various services by executing the various types of processing in the stratosphere.

For example, by the aircraft 100 being equipped with the module 300, which is capable of spraying chemical agents, to spray the chemical agents into a hurricane, a typhoon, and the like from the sky, it is possible to realize a service of weakening or extinguishing a storm. Further, for example, by the aircraft 100 being equipped with the module 300, which has a laser radiation function or the like, to radiate the laser to a hurricane, typhoon, and the like from the sky, it is possible to realize a service of weakening or extinguishing a storm.

Further, for example, by the aircraft 100 being equipped with the module 300, which includes a camera, a radar, and the like, it is possible for the aircraft 100 to realize a service of observing a typhoon, a hurricane, and a cyclone. In this case, for example, the aircraft 100 is always deployed in the stratosphere in the vicinity of the centers of the typhoon, the hurricane, and the cyclone that are observation targets. By the module 300 being equipped with a radiosonde and a function of dropping the radiosonde, it is also possible to realize a service which enables the radiosonde to be dropped toward the vicinity of the centers of the typhoon, the hurricane, and the cyclone. It is also possible to acquire actual measurement data of a tropical disturbance that cannot be obtained by a satellite observation, and thus it is also possible to enhance prediction accuracy.

Further, for example, by each of plurality of aircrafts 100 being equipped with the module 300, which includes an observation device, a sensor, and the like, to fly in each area of the stratosphere, it is also possible to realize a stratosphere observation network all over the world. For example, it is possible to realize an observation network that can observe a temperature distribution, a wind direction, a wind speed, an ozone level, or the like. By the module 300 obtaining an observed value, it becomes possible to more precisely grasp a circulation, a motion, a structure, a chemical composition, or the like in the stratosphere, which can contribute to an elucidation of an actual condition of the middle atmosphere. By observing the stratosphere, it is also possible to realize, by the sensor, a continuous observation of ozone depletion due to chlorofluorocarbon or the like, a state of a greenhouse gas, or the like, which can contribute to an elucidation of a formation and disappearance process of a gas relating to the atmospheric environment.

Further, for example, by the aircraft 100 being equipped with the module 300, which includes a high-definition camera for observing a space side, it is possible to realize services which can contribute to checking of a state of the sun, monitoring of asteroid approach, monitoring of the movement of the universe, discovering of a new planet, and the like. Further, by mounting the module 300 which includes a sensor for stellar wind such as solar wind, it is also possible to realize a service capable of observing the stellar wind.

Further, for example, by the aircraft 100 being equipped with the module 300, which includes the camera, the radar, and the like, to monitor the sky, it is possible to realize a service which enables a flying object such as a missile to be detected and visually checked, through an image, and enables a flight route thereof or the like to be calculated. Further, by the module 300 monitoring an airplane, it is also possible to realize a service which enables a location of the airplane to be monitored from an outside regardless of an intention of an airplane side.

Further, for example, by the aircraft 100 being equipped with the module 300, which includes the camera or the like capable of capturing the image of the ground, to monitor the ground, it is possible to realize a service of searching for lost children in an event, a theme park, and the like. In this case, for example, a service in which a target person is recognized from a past image, a trajectory of the target person up to a current image is checked, and a current location is detected, is executed.

Further, for example, by the aircraft 100 being equipped with the module 300, which includes the camera or the like capable of capturing the image of the ground, to monitor the ground, it is possible to realize a service of tracking a suspicious person in an event, a theme park, and the like. In this case, for example, a service, in which the suspicious person is marked at an entrance gate, and is recognized by image data, and then the target person is tracked in real time by using an image analysis technology, and an alert is output when suspicious behavior is detected, or the like, is executed.

Further, for example, by the aircraft 100 being equipped with the module 300, which includes the camera or the like capable of capturing the image of the ground, to monitor the ground, it is possible to realize a service of detecting a suspicious drone in an event, a theme park, and the like. In this case, for example, a service in which a signal transmitter is attached to a drone for which a permission has been obtained before the event, and an alert is output when a drone other than that appears as an image, or the like, is executed.

For example, when the ground is monitored from the aircraft 100 flying at a fixed point in an orbit with a radius of 3 km or the like, in order to capture a still image and record a video in specific coordinates, the camera may be automatically controlled by using an altimeter, GPS (Global Positioning System) positioning information, a gyro sensor, a heading indicator, and the like.

Further, for example, by mounting, on the aircraft 100, the module 300 which includes an astronomical telescope, and enabling a remote operation of the astronomical telescope from the ground via the ground station 22, it is possible to realize a service capable of controlling and observing an observation point in real time. Further, by processing the image obtained from the astronomical telescope in real time by AI (Artificial Intelligence) and deep learning, it is also possible to realize a service that enables a highly accurate, and clear observation.

Further, for example, by mounting, on the aircraft 100, the module 300 which includes a detector for detecting radio waves, infrared rays, ultraviolet rays, X-rays, other cosmic rays (flows of particles moving at high speed with energy), or the like, and enabling the remote operation of the detector from the ground via the ground station 22, it is possible to realize a service that enables the operation of the detector to observe them in real time continuously for a long time. Further, it is also possible to realize a service which achieves an enhancement of data accuracy by a real time analysis of the obtained data by the AI and the deep learning. The X-rays, gamma rays, and the like from celestial bodies are absorbed by the Earth's atmosphere, and thus may not be easy to observe from the ground; however, by mounting the detector on the aircraft 100, it is possible to detect the X-rays, the gamma rays, and the like before they are absorbed.

Further, for example, by the aircraft 100 being equipped with the module 300, which includes the launching device for the small rocket, it is possible to realize a service capable of launching the small rocket from the aircraft 100. In the stratosphere, gravity, atmospheric density, and atmospheric pressure are lower than in the ground, and gravity loss, air resistance loss, and thrust loss are reduced. Further, it is also possible to take advantage of characteristics of weather being stable with respect to freezing layers, thunderclouds, and the like. For example, by moving the aircraft 100 to an optimal area according to a target altitude and orbit of the small rocket, it is possible to realize a service which provides an optimal launch environment. Further, it is possible to realize a service which enables real time remote control of these series of operations from the ground.

Further, for example, by the aircraft 100 being equipped with the module 300 which includes the camera, it is also possible to realize a virtual stratospheric travel service. The stratosphere is a place that cannot be reached by airplane, and space travel seems to be popular, and thus the virtual travel in the stratosphere by using VR (Virtual Reality) may be available. In this case, the aircraft 100 is equipped with a 360° camera with a telephoto function to provide a virtual space simulating a sensation of floating in the stratosphere. The telephoto function simulates a sensation of moving, and a chair or the like that transmits a vibration or the like may also be used in combination to give a realistic sensation.

Further, for example, by the aircraft 100 being equipped with the module 300 which includes a sprayer for spraying cremains, ashes, and the like, it is also possible to realize a stratospheric burial service. There is a service of spraying cremains on the sea, a service of sending ashes to space, or the like; however, with the aircraft 100 and module 300 according to the present embodiment, it is possible to realize a service of spraying the cremains, the ashes, and the like in the stratosphere. The aircraft 100 sprays, for example, the cremains, the ashes, and the like according to a timing when the aircraft 100 has moved to a designated place in the stratosphere, a timing designated from the ground, or the like.

Further, for example, the aircraft 100 may operate as a wireless base station in a mobile wireless communication system, and the module 300 may operate as an edge computer in the mobile wireless communication system. For example, this makes it possible to realize a service in which the module 300 performs data processing on the data received from the first user terminal 30 in the communication area 120 via a service link, and transmits a processing result to the first user terminal 30 via the service link. Further, for example, it is also possible to realize a service in which the user terminal 30 transmits the data received from the first user terminal 30 in the communication area 120 via the service link to the second user terminal 30 in the communication area 120 via the service link.

The data or the like detected by the module 300 may be transmitted to a service platform 500. The aircraft 100 may transmit the data detected by the module 300 to the service platform 500 via the management device 400. Further, the aircraft 100 may also transmit the data detected by the module 300 to the service platform 500 without going through the management device 400.

Figure 2:
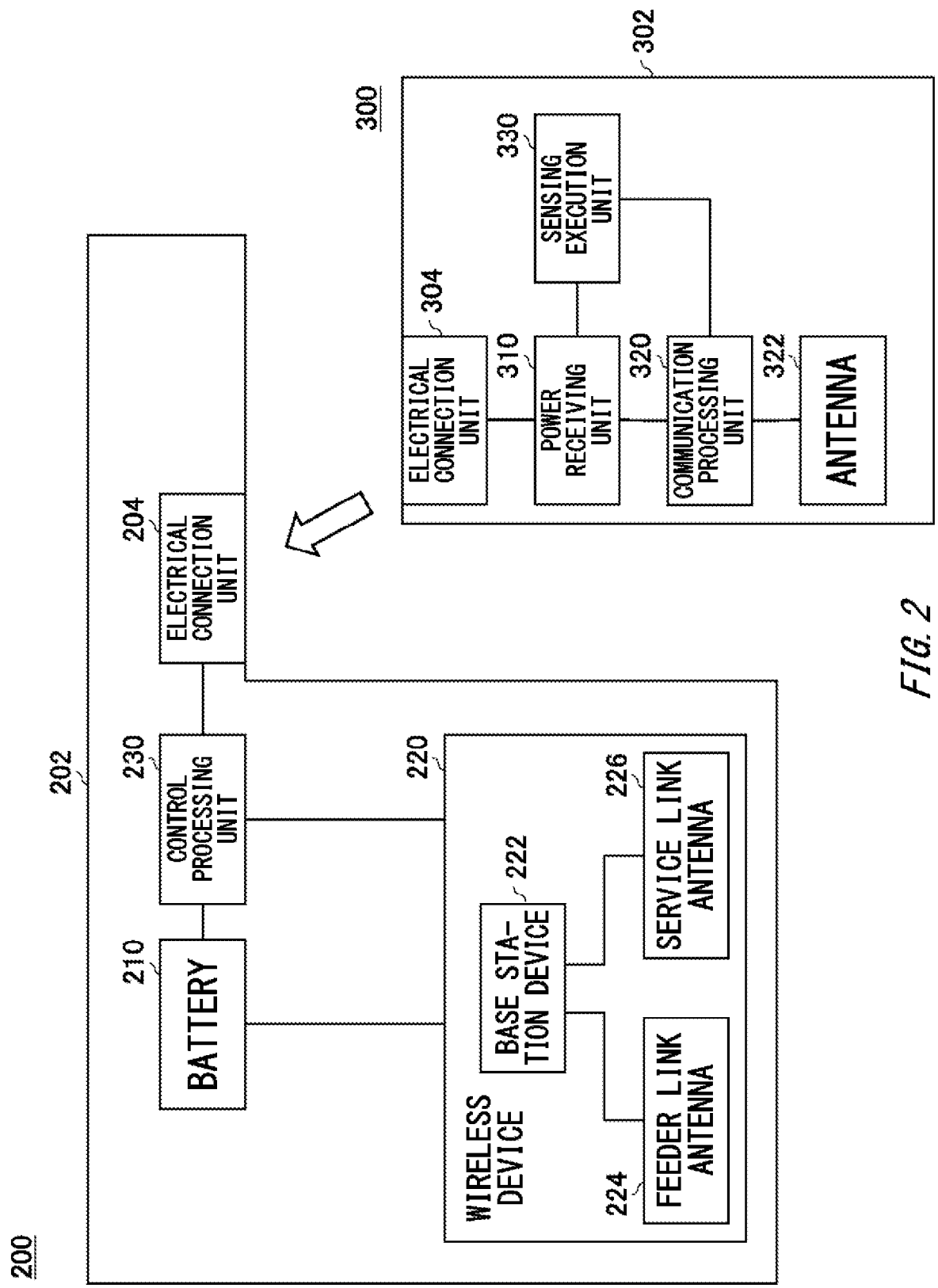
FIG. 2 schematically shows examples of configurations of a control device 200 and a module 300.

FIG. 2 schematically shows examples of configurations of a control device 200 and a module 300. The control device 200 includes a housing 202, an electrical connection unit 204, a battery 210, a wireless device 220, and a control processing unit 230.

Note that it is not essential that the control device 200 includes all of these configurations. For example, the control device 200 may not have the battery 210, and in this case, the battery 210 may be arranged outside the housing 202. Further, for example, the control device 200 may not have the wireless device 220, and in this case, the wireless device 220 may be arranged outside the housing 202.

The housing 202 includes the module attachment and detachment unit (not shown) to and from which the module 300 is physically attachable and detachable. Any means can be adopted as means for attaching and detaching the module 300 to and from the module attachment and detachment unit. For example, the module attachment and detachment unit has a recess where module 300 can be accommodated, and the module 300 is inserted into or removed from the recess. The module 300 may be, for example, fixed to the control device 200 by a rack mount method. Further, for example, the module 300 may be fixed to the control device 200 in a cassette system.

The electrical connection unit 204 electrically connects the module 300 to the battery 210. The battery 210 may be a so-called secondary battery, a storage battery, and the like, or may be a battery of any type such as a lithium ion battery and a lithium air battery. The battery 210 may store the power generated by the solar panel 112.

Further, the wireless device 220 uses the power stored in the battery 210 to form the communication area on the ground, and provide the wireless communication service to the communication terminal in the communication area. The wireless device 220 may operate as the wireless base station in the mobile wireless communication system.

The wireless device 220 includes a base station device 222, a feeder link antenna 224 for communicating with the ground station 22, and a service link antenna 226 for communicating with the user terminal 30. The base station device 222 uses the feeder link antenna 224 and the service link antenna 226 to provide the wireless communication service to the user terminal 30.

The control processing unit 230 performs various types of control processing. The control processing unit 230 controls, for example, an amount of power supplied from the battery 210 to the module 300, and controls the communication between the wireless device 220 and the module 300.

The module 300 illustrated in FIG. 2 includes a housing 302 that is physically attachable to and detachable from the module attachment and detachment unit of the control device 200, an electrical connection unit 304, a power receiving unit 310, a communication processing unit 320, an antenna 322, and a sensing execution unit 330.

The electrical connection unit 304 is connected to the electrical connection unit 204. The power receiving unit 310 receives the power from the battery 210 via the electrical connection unit 304. For example, as connecting means between the electrical connection unit 304 and the electrical connection unit 204, any means such as a socket method can be adopted.

The communication processing unit 320 uses the power received by the power receiving unit 310 to communicate with the wireless device 220. In the example shown in FIG. 2, the communication processing unit 320 communicates with the wireless device 220 by the antenna 322 receiving radio waves sent by the service link antenna 226. The communication processing unit 320 may communicate with the wireless device 220 by the antenna 322 receiving leaked radio waves of the service link antenna 226 that radiates a beam toward the ground to form the communication area on the ground. Further, the communication processing unit 320 communicates with the wireless device 220 by radio waves sent by the antenna 322. The communication processing unit 320 may communicate with the wireless device 220 as a user terminal in the mobile wireless communication system.

Note that the communication processing unit 320 may communicate with the wireless device 220 without the antenna 322. For example, the communication processing unit 320 and the wireless device 220 may perform the communication via a wired connection by the control device 200 having a connection terminal connected to the wireless device 220 in the housing 202, the module 300 having a connection terminal connected to the communication processing unit 320 in the housing 302, and these connection terminals being connected to each other.

The sensing execution unit 330 executes sensing by using the power received by the power receiving unit 310. The sensing execution unit 330 may execute the sensing on any target. The sensing execution unit 330 may output sensor data which indicates a sensing result to the communication processing unit 320. The sensing execution unit 330 may have a storage unit for storing the sensor data. The sensing execution unit 330 may not have a storage unit for storing the sensor data.

The communication processing unit 320 transmits, to a predetermined destination via the wireless device 220, the sensor data which indicates the sensing result obtained by the sensing execution unit 330. For example, the communication processing unit 320 transmits the sensor data to the user terminal 30 or the service platform 500 via the wireless device 220.

Figure 3:
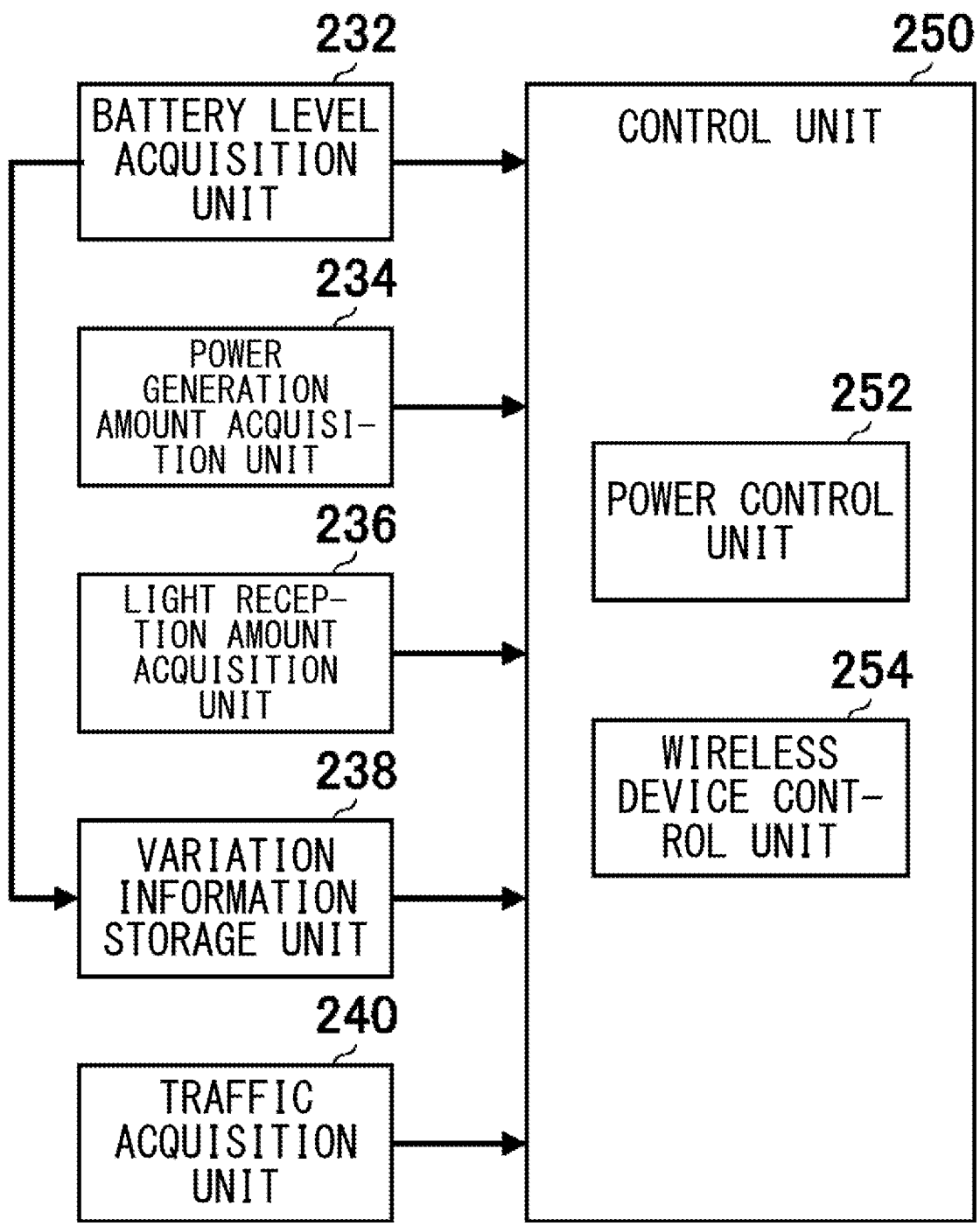
FIG. 3 schematically shows an example of a functional configuration of a control processing unit 230.

FIG. 3 schematically shows an example of a functional configuration of a control processing unit 230. The control processing unit 230 has a battery level acquisition unit 232, a power generation amount acquisition unit 234, a light reception amount acquisition unit 236, a variation information storage unit 238, a traffic acquisition unit 240, and a control unit 250. Note that it is not essential that the control processing unit 230 has all of these configurations.

The battery level acquisition unit 232 acquires a battery level of the battery 210. The battery level acquisition unit 232 may acquire the battery level from the battery 210.

The power generation amount acquisition unit 234 acquires a power generation amount of the aircraft 100. The power generation amount acquisition unit 234 may acquire, for example, from the solar panel 112, power generation amount information which indicates the power generation amount of the power generated by the solar panel 112.

The light reception amount acquisition unit 236 acquires a light reception amount of light received by the solar panel 112. When the solar panel 112 has a light reception amount sensor, the light reception amount acquisition unit 236 may acquire the light reception amount detected by the light reception amount sensor. Further, when the aircraft 100 has the light reception amount sensor installed at a location corresponding to the solar panel 112, the light reception amount acquisition unit 236 may acquire the light reception amount detected by the light reception amount sensor.

The variation information storage unit 238 stores variation information which indicates a variation of the battery level of the battery 210 for each date and time. The variation information makes it possible to specify a transition of the battery level for each season, each day of the week, each time zone, or the like. For example, the variation information storage unit 238 may generate and store the variation information by continuously acquiring the battery level acquired by the battery level acquisition unit 232.

The traffic acquisition unit 240 acquires the traffic information which indicates the communication traffic in the wireless communication services provided by the aircraft 100 to the plurality of user terminals 30. The traffic acquisition unit 240 may acquire the traffic information by monitoring the communication traffic in the wireless communication services provided to the plurality of user terminals 30. Further, the traffic acquisition unit 240 may receive the traffic information from the management device 400.

The control unit 250 executes various controls based on the information acquired by the battery level acquisition unit 232, the power generation amount acquisition unit 234, the light reception amount acquisition unit 236, the variation information storage unit 238, and the traffic acquisition unit 240. The control unit 250 has a power control unit 252 and a wireless device control unit 254.

The power control unit 252 controls the amount of power supplied from the battery 210 to the module 300. The power control unit 252 changes, for example, the amount of power supplied from the battery 210 to the module 300. The power control unit 252 changes, for example, the power supplied from the battery 210 to the module 300 by using a so-called power controller. Further, the power control unit 252 stops, for example, power supply from the battery 210 to the module 300. The power control unit 252 controls, for example, the power supply from the battery 210 to the module 300 by an ON/OFF switch.

The power control unit 252 may control the amount of power supplied from the battery 210 to the module 300 according to the battery level acquired by the battery level acquisition unit 232. For example, the power control unit 252 stops the power supply from the battery 210 to the module 300 when the battery level is lower than a predetermined threshold. This makes it possible to prevent a shortage of power supplied to the wireless device 220 which is caused by power being supplied to the module 300 when an amount of surplus power is insufficient. That is, this makes it possible to prioritize the provision of the wireless communication service to the user terminal 30 over the processing by the module 300. The power control unit 252 may make the control such that the amount of power supplied from the battery 210 to the module 300 decreases as the battery level decreases.

The power control unit 252 may control the amount of power supplied from the battery 210 to the module 300 according to the power generation amount acquired by the power generation amount acquisition unit 234. For example, the power control unit 252 stops the power supply from the battery 210 to the module 300 when the power generation amount is lower than a predetermined threshold. This makes it possible to prevent a shortage of power supplied to the wireless device 220 which is caused by power being supplied to the module 300 in a state in which the power generation amount is low. The power control unit 252 may make the control such that the amount of power supplied from the battery 210 to the module 300 decreases as the power generation amount decreases.

The power control unit 252 may control the amount of power supplied from the battery 210 to the module 300 according to the light reception amount acquired by the light reception amount acquisition unit 236. For example, the power control unit 252 stops the power supply from the battery 210 to the module 300 when the light reception amount is lower than a predetermined threshold. This makes it possible to prevent a shortage of power supplied to the wireless device 220 which is caused by power being supplied to the module 300 in a state in which the light reception amount of the solar panel 112 is low. The power control unit 252 may make the control such that the amount of power supplied from the battery 210 to the module 300 decreases as the light reception amount decreases.

The power control unit 252 may control the amount of power supplied from the battery 210 to the module 300 according to the variation information stored in the variation information storage unit 238. For example, the power control unit 252 may predict, from the variation information, a period during which the battery level is lower than a predetermined threshold, and schedule a period for stopping the power supply from the battery 210 to the module 300 according to the prediction. Then, according to the schedule, the power supply from the battery 210 to the module 300 may be stopped.

The power control unit 252 may control the amount of power supplied from the battery 210 to the module 300 according to the communication traffic indicated by the traffic information acquired by the traffic acquisition unit 240. For example, the power control unit 252 stops the power supply from the battery 210 to the module 300 when the communication traffic is higher than a predetermined threshold.

The wireless device control unit 254 controls the wireless device 220. The wireless device control unit 254 controls, for example, the wireless device 220 so as to restrict the communication of the communication processing unit 320 of the module 300 according to the communication traffic indicated by the traffic information acquired by the traffic acquisition unit 240. The wireless device control unit 254 causes the wireless device 220 to restrict the communication of the communication processing unit 320 when the communication traffic is higher than a predetermined threshold.

The wireless device 220 restricts the communication of the communication processing unit 320 under the control of the wireless device control unit 254. The wireless device 220 may restrict the communication of the communication processing unit 320 by reducing a communication band allocated to the communication processing unit 320. Further, the wireless device 220 may restrict the communication of the communication processing unit 320 by prohibiting the communication performed by the communication processing unit 320.

The wireless device 220 restricts, for example, the communication of the communication processing unit 320 by transmitting an AMBR (Aggregate Maximum Bit Rate) message to the communication processing unit 320. The wireless device 220 can operate as the wireless base station in the mobile wireless communication system, and the module 300 can operate as the user terminal in the mobile wireless communication system, and thus it is possible for a wireless device 220 side to restrict, by using an AMBR function, an amount of data (a throughput) transmitted by the module 300.

Further, in a case where a QCI (QoS Class Identifier) for the module 300 that is used when the communication is restricted is predefined, and the wireless device 220 restricts the communication of the communication processing unit 320, the QCI may be used.

The wireless device control unit 254 may determine a communication schedule for permitting the communication performed by the module 300, and control the wireless device 220 so as to schedule the communication of the communication processing unit 320 of the module 300 according to the communication schedule. For example, the wireless device control unit 254 generates traffic variation information which indicates the communication traffic for each date and time based on the traffic information acquired by the traffic acquisition unit 240, and determines the communication schedule based on the traffic variation information. The wireless device control unit 254 specifies, for example, a period during which the communication traffic is relatively low based on the traffic variation information, and determines the communication schedule for executing the communication during the specified period.

The wireless device 220 may schedule the communication of the communication processing unit 320 according to the communication schedule determined by the wireless device control unit 254. For example, according to the communication schedule, the wireless device 220 causes the communication processing unit 320 to communicate during the period when the communication traffic in the wireless communication service, which is provided to the user terminal 30, is relatively low. This makes it possible to prevent a deterioration of service status of the wireless communication service provided to the user terminal 30, the deterioration occurring due to causing the communication processing unit 320 to communicate during a period when the communication traffic in the wireless communication service, which is provided to the user terminal 30, is high.

Figure 4:
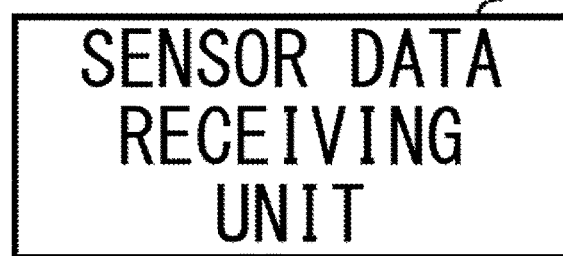
FIG. 4 schematically shows an example of a functional configuration of a service platform 500.
Figure 4:
Figure 4:
Figure 4:

FIG. 4 schematically shows an example of a functional configuration of a service platform 500. The service platform 500 includes a sensor data receiving unit 502, a sensor data storage unit 504, a sensor data analysis unit 506, and a sensor data output unit 508.

The sensor data receiving unit 502 receives the sensor data transmitted by the module 300. The sensor data storage unit 504 stores a plurality of pieces of sensor data, the sensor data being received by the sensor data receiving unit 502. The sensor data storage unit 504 may store the plurality of pieces of sensor data as big data.

The sensor data analysis unit 506 analyzes the plurality of pieces of sensor data stored in the sensor data storage unit 504. The sensor data analysis unit 506 may analyze the sensor data by using various analysis methods according to a type of the sensor data.

The sensor data output unit 508 outputs an analysis result obtained by the sensor data analysis unit 506. The sensor data analysis unit 506 transmits, for example, the analysis result to a communication terminal of a person who desires to utilize the big data stored in the sensor data storage unit 504.

Figure 5:
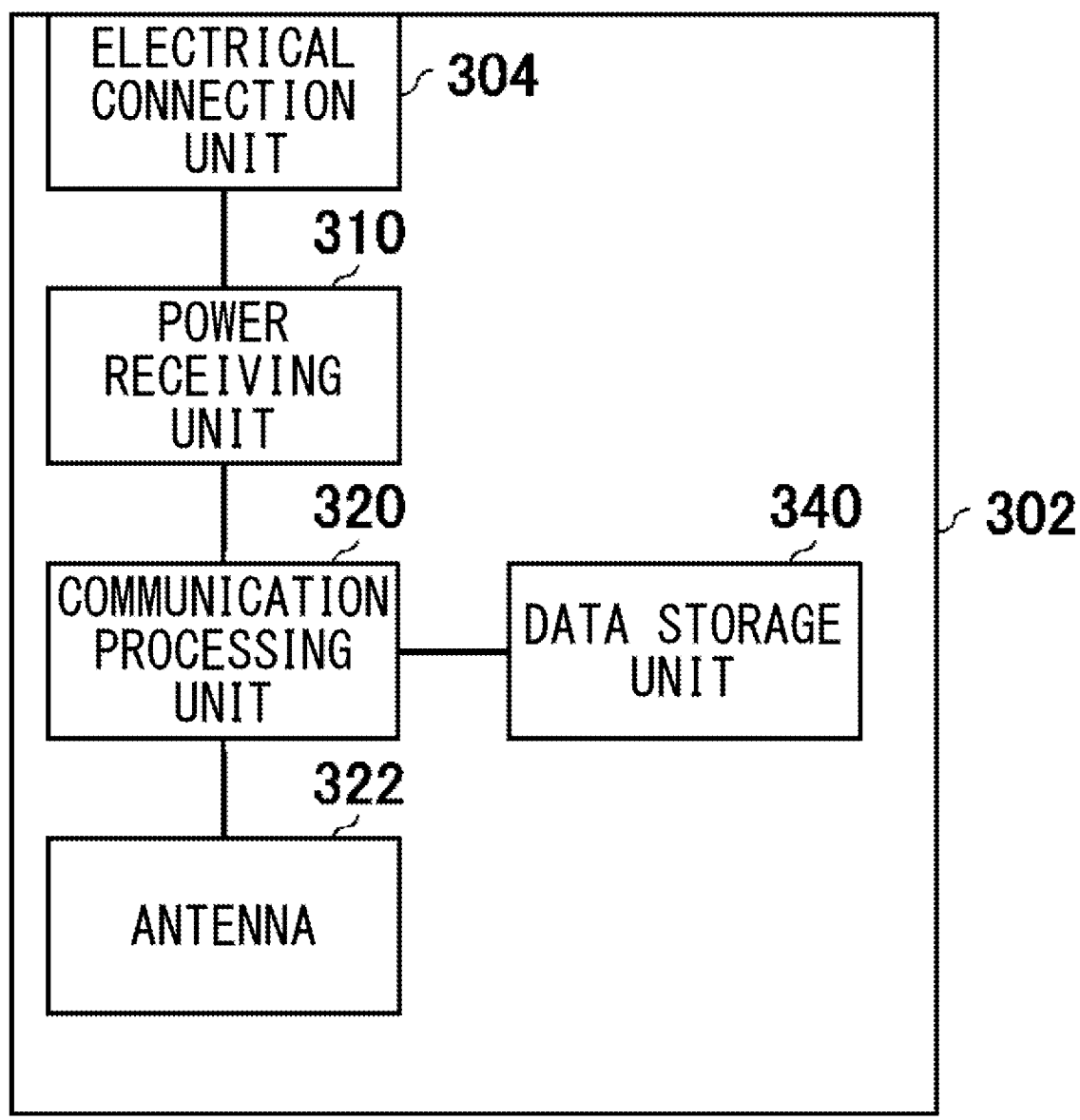
FIG. 5 schematically shows an example of another configuration of the module 300.

FIG. 5 schematically shows an example of another configuration of the module 300. Here, points different from the module 300 illustrated in FIG. 2 will be mainly described. The module 300 illustrated in FIG. 5 has a data storage unit 340.

For example, when it is not possible to execute the communication with the ground station 22 by the feeder link antenna 224 due to the ground station 22 being out of range, or the like, the wireless device 220 may transmit, to the module 300, the data received by the service link antenna 226 from the user terminal 30, and cause the data to be stored in the data storage unit 340. Further, when a state in which it is not possible to execute the communication with the ground station 22 by the feeder link antenna 224 changes into a state in which it is possible to execute the communication with the ground station 22 by the feeder link antenna 224 due to the ground station 22 being within range, or the like, the wireless device 220 may transmit, to the ground station 22, the data which has been caused to be stored in the data storage unit 340.

This enables the data to be collectible from the user terminal 30 by the service link antenna 226 even when it is not possible to execute the communication with the ground station 22 by the feeder link antenna 224. For example, when the ground station 22 is in a state of being unable to communicate in a case such as a disaster, the aircraft 100 flies over a disaster area to collect data transmitted by the plurality of user terminals 30, moves to an area where the ground station 22 is operating, and transmits the collected data to the ground station 22, so that it is possible to transfer, to the destination, the data transmitted by the user terminal 30 in the disaster area.

Figure 6:
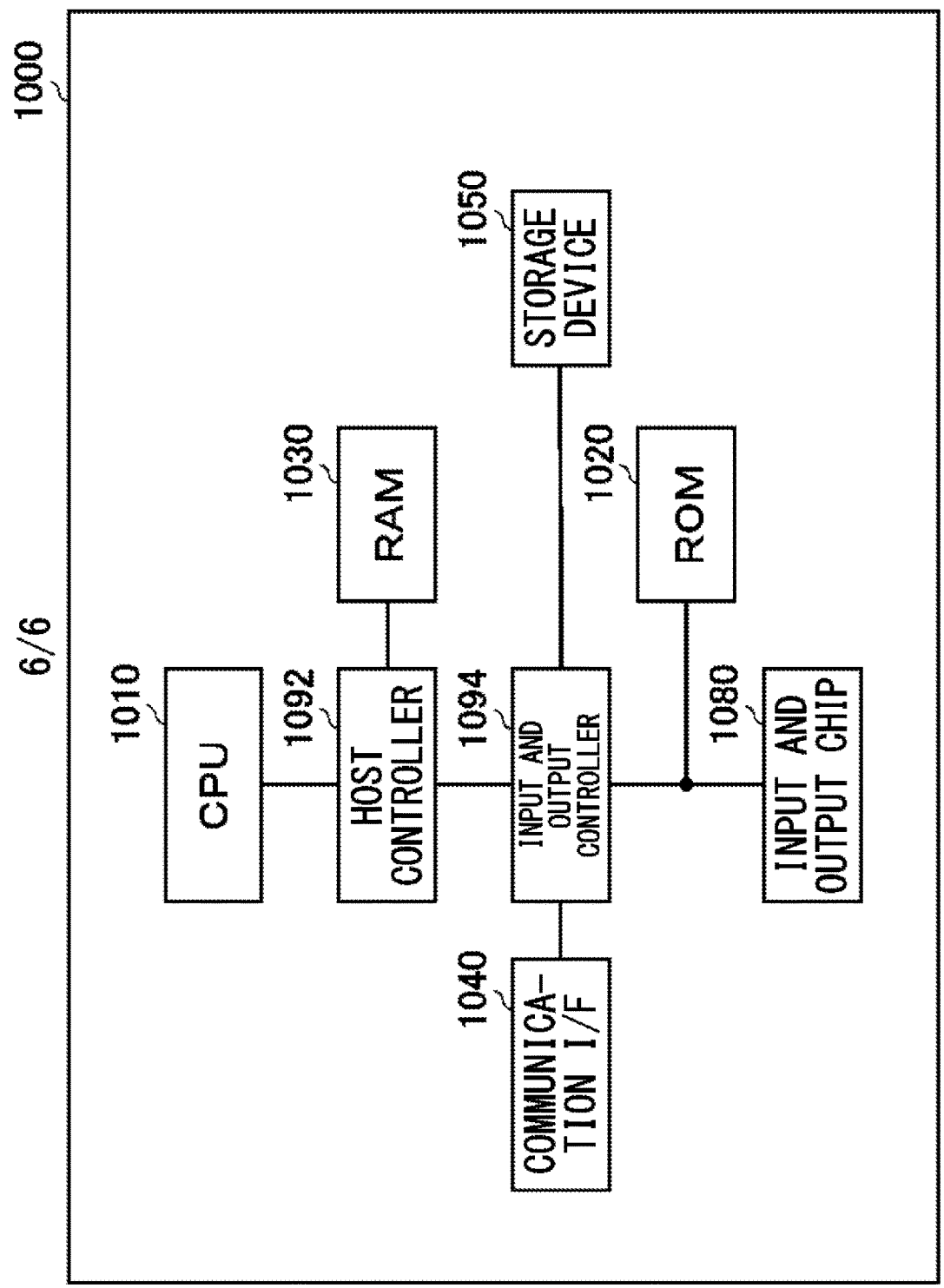
FIG. 6 schematically shows an example of a hardware configuration of a computer 1000 that functions as the control processing unit 230.

FIG. 6 schematically shows an example of a computer 1000 that functions as the control processing unit 230. The computer 1000 according to the present embodiment includes a CPU peripheral unit having a CPU 1010 and a RAM 1030 that are connected to each other by a host controller 1092, and an input and output unit having a ROM 1020, a communication I/F 1040, a storage device 1050, and an input and output chip 1080 that are connected to the host controller 1092 by an input and output controller 1094.

The CPU 1010 operates based on programs stored in the ROM 1020 and the RAM 1030, and controls each unit. The communication I/F 1040 performs a communication with other devices via a network. Further, the communication I/F 1040 functions as hardware for performing the communication. The storage device 1050 may be a hard disk drive, a solid-state drive, and the like, and stores programs and data used by the CPU 1010.

The ROM 1020 stores a boot program executed by the computer 1000 at the time of activation, a program depending on hardware of the computer 1000, and the like. The input and output chip 1080 connects, for example, various input and output units to the input and output controller 1094 via a USB port, parallel port, a serial port, a keyboard port, a mouse port, or the like.

The program provided to the storage device 1050 via the RAM 1030 is stored in a recording medium such as an IC card, and provided by the user. The program is read from the recording medium, installed on the storage device 1050 via the RAM 1030, and executed in the CPU 1010.

A program, which is installed on the computer 1000 and causes the computer 1000 to function as the control processing unit 230, may work on CPU 1010 or the like to cause the computer 1000 to function as each unit of the control processing unit 230. Information processing written in these programs functions, by being read by the computer 1000 as specific means by which software and the various hardware resources described above cooperate, and which are the battery level acquisition unit 232, the power generation amount acquisition unit 234, the light reception amount acquisition unit 236, the variation information storage unit 238, the traffic acquisition unit 240, and the control unit 250. Then, the specific means realizes calculation or processing of information according to a purpose of use of the computer 1000 in the present embodiment such that the unique control processing unit 230 according to the purpose of use is constructed.

In the above-described embodiment, the wireless device 220 may have a configuration in which feeder link communication equipment and service link communication equipment are included. For example, the service link communication equipment may be an eNB, and may be attachable to and detachable from the wireless device 220. For example, in a state in which the service link communication equipment is not attached, the aircraft 100 may transmit, to the ground, an image captured by a monitoring camera of the aircraft 100 by the feeder link communication equipment to provide a service such as monitoring and analyzing. The monitoring camera may be mounted on the aircraft 100, or may be attached to the aircraft 100 as the module 300. Then, after providing such a service, by the service link communication equipment being attached, the aircraft 100 may form the communication area on the ground so as to provide the wireless communication service to the user terminal in the communication area.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 system, 20 network, 22 ground station, 30 user terminal, 100 aircraft, 104 main wing unit, 106 propeller, 108 skid, 110 wheel, 112 solar panel, 120 communication area, 122 sub-cell, 200 control device, 202 housing, 204 electrical connection unit, 210 battery, 220 wireless device, 222 base station device, 224 feeder link antenna, 226 service link antenna, 230 control processing unit, 232 battery level acquisition unit, 234 power generation amount acquisition unit, 236 light reception amount acquisition unit, 238 variation information storage unit, 240 traffic acquisition unit, 250 control unit, 252 power control unit, 254 wireless device control unit, 300 module, 302 housing, 304 electrical connection unit, 310 power receiving unit, 320 communication processing unit, 322 antenna, 330 sensing execution unit, 340 data storage unit, 400 management device, 500 service platform, 502 sensor data receiving unit, 504 sensor data storage unit, 506 sensor data analysis unit, 508 sensor data output unit, 1000 computer, 1010 CPU, 1020 ROM, 1030 RAM, 1040 communication I/F, 1050 storage device, 1080 input and output chip, 1092 host controller, 1094 input and output controller

What is claimed is:

1. A system comprising:
a control device mounted on an aircraft and configured to control the aircraft, the aircraft having
a battery, and
a wireless device configured to use power stored in the battery to form a communication area on the ground, and provide a wireless communication service to a user terminal in the communication area; and
a module that is physically attachable to and detachable from the control device, wherein
the control device has
a housing that includes a module attachment and detachment unit to and from which the module is physically attachable and detachable,
an electrical connection unit configured to electrically connect the module to the battery when the module is attached to the module attachment and detachment unit,
a variation information storage unit configured to store variation information which indicates a variation of the battery level of the battery for each date and time, and
a power control unit configured to control an amount of power supplied from the battery to the module, wherein the power control unit is configured to control the amount of power supplied from the battery to the module based on the variation information, and
the module has
a housing that is physically attachable to and detachable from the module attachment and detachment unit,
a power receiving unit configured to electrically connect to the battery and receive power from the battery when the housing of the module is attached to the module attachment and detachment unit, and
a communication processing unit configured to use the power received by the power receiving unit to communicate with the wireless device.

2. The system according to claim 1, wherein
the control device includes a battery level acquisition unit configured to acquire a battery level of the battery, and
the power control unit is configured to control the amount of power supplied from the battery to the module according to the battery level.

3. The system according to claim 2,
wherein the power control unit is configured to stop power supply from the battery to the module when the battery level is lower than a predetermined threshold.

4. The system according to claim 2,
wherein the power control unit is configured to decrease the amount of power supplied from the battery to the module as the battery level decreases.

5. The system according to claim 1, wherein
the wireless device is configured to operate as a wireless base station in a mobile wireless communication system, and
the communication processing unit is configured to communicate with the wireless device as a user terminal in the mobile wireless communication system.

6. The system according to claim 5, wherein
the wireless device has
a feeder link antenna configured to communicate with a ground station, and
a service link antenna configured to communicate with the user terminal, and
the communication processing unit is configured to communicate with the wireless device by receiving radio waves sent by the service link antenna.

7. The system according to claim 6,
wherein the communication processing unit is configured to communicate with the wireless device by receiving leaked radio waves sent by the service link antenna.

8. The system according to claim 6, wherein
the module has a data storage unit configured to store data, and
the wireless device is configured to transmit, to the module, data received by the service link antenna from the user terminal, and cause the data to be stored in the data storage unit when it is not possible to execute the communication with the ground station by the feeder link antenna.

9. The system according to claim 8,
wherein the wireless device is configured to transmit, to the ground station, the data which has been caused to be stored in the data storage unit, when a state in which it is not possible to execute the communication with the ground station by the feeder link antenna changes into a state in which it is possible to execute the communication with the ground station by the feeder link antenna.

10. The system according to claim 5,
wherein the wireless device is configured to restrict the communication of the communication processing unit when the communication traffic in the wireless communication service provided to the user terminal is higher than a predetermined threshold.

11. The system according to claim 10,
wherein the wireless device is configured to restrict the communication of the communication processing unit by reducing a communication band allocated to the communication processing unit.

12. The system according to claim 10,
wherein the wireless device is configured to restrict the communication of the communication processing unit by prohibiting the communication performed by the communication processing unit.

13. A system comprising:
a control device mounted on an aircraft and configured to control the aircraft, the aircraft having
 a battery, and
 a wireless device configured to use power stored in the battery to form a communication area on the ground, and provide a wireless communication service to a user terminal in the communication area; and
a module that is physically attachable to and detachable from the control device, wherein
the control device has
 a housing that includes a module attachment and detachment unit to and from which the module is physically attachable and detachable,
 an electrical connection unit configured to electrically connect the module to the battery when the module is attached to the module attachment and detachment unit,
 a traffic acquisition unit configured to acquire traffic information which indicates communication traffic in the wireless communication services provided to the user terminal by the wireless device, and
 a power control unit configured to control an amount of power supplied from the battery to the module, wherein the power control unit is configured to control the amount of power supplied from the battery to the module according to the communication traffic, and
the module has
 a housing that is physically attachable to and detachable from the module attachment and detachment unit,
 a power receiving unit configured to electrically connect to the battery and receive power from the battery when the housing of the module is attached to the module attachment and detachment unit, and
 a communication processing unit configured to use the power received by the power receiving unit to communicate with the wireless device.

14. The system according to claim 13, wherein
the aircraft has a solar panel,
the battery is configured to store power generated by the solar panel,
the control device has a power generation amount acquisition unit configured to acquire a power generation amount of the power generated by the solar panel, and
the power control unit is configured to control the amount of power supplied from the battery to the module according to the power generation amount.

15. The system according to claim 13, wherein
the aircraft has a solar panel,
the battery is configured to store the power generated by the solar panel,
the control device has a light reception amount acquisition unit configured to acquire a light reception amount of light received by the solar panel, and
the power control unit is configured to control the amount of power supplied from the battery to the module according to the light reception amount.

16. A system comprising:
a control device mounted on an aircraft and configured to control the aircraft, the aircraft having
 a battery, and
 a wireless device configured to use power stored in the battery to form a communication area on the ground, and provide a wireless communication service to a user terminal in the communication area; and
a module that is physically attachable to and detachable from the control device, wherein
the control device has
 a housing that includes a module attachment and detachment unit to and from which the module is physically attachable and detachable, and
 an electrical connection unit configured to electrically connect the module to the battery when the module is attached to the module attachment and detachment unit, and
the module has
 a housing that is physically attachable to and detachable from the module attachment and detachment unit,
 a power receiving unit configured to electrically connect to the battery and receive power from the battery when the housing of the module is attached to the module attachment and detachment unit, and
 a communication processing unit configured to use the power received by the power receiving unit to communicate with the wireless device,
the wireless device is configured to operate as a wireless base station in a mobile wireless communication system, and
the communication processing unit is configured to communicate with the wireless device as a user terminal in the mobile wireless communication system.

17. A system comprising:
a control device mounted on an aircraft and configured to control the aircraft, the aircraft having
 a battery, and
 a wireless device configured to use power stored in the battery to form a communication area on the ground, and provide a wireless communication service to a user terminal in the communication area; and
a module that is physically attachable to and detachable from the control device, wherein
the control device has
 a housing that includes a module attachment and detachment unit to and from which the module is physically attachable and detachable, and
 an electrical connection unit configured to electrically connect the module to the battery when the module is attached to the module attachment and detachment unit,
the module has
 a housing that is physically attachable to and detachable from the module attachment and detachment unit,
 a power receiving unit configured to electrically connect to the battery and receive power from the battery when the housing of the module is attached to the module attachment and detachment unit, and a communication processing unit configured to use the power received by the power receiving unit to communicate with the wireless device, the wireless device is configured to operate as a wireless base station in a mobile wireless communication system, and the communication processing unit is configured to communicate with the wireless device as an edge computer in the mobile wireless communication system.

18. A system comprising:

a control device mounted on an aircraft and configured to control the aircraft, the aircraft having a battery, and a wireless device configured to use power stored in the battery to form a communication area on the ground, and provide a wireless communication service to a user terminal in the communication area; and a module that is physically attachable to and detachable from the control device, wherein the control device has a housing that includes a module attachment and detachment unit to and from which the module is physically attachable and detachable, and an electrical connection unit configured to electrically connect the module to the battery when the module is attached to the module attachment and detachment unit, the module has a housing that is physically attachable to and detachable from the module attachment and detachment unit, a power receiving unit configured to electrically connect to the battery and receive power from the battery when the housing of the module is attached to the module attachment and detachment unit, and a communication processing unit configured to use the power received by the power receiving unit to communicate with the wireless device, the wireless device has feeder link communication equipment and service link communication equipment, and the service link communication equipment is attachable to and detachable from the wireless device.

19. A control device mounted on an aircraft and configured to control the aircraft, the aircraft having a battery, and a wireless device configured to use power stored in the battery to form a communication area on the ground, and provide a wireless communication service to a user terminal in the communication area, the control device comprising:

a housing that has a module attachment and detachment unit to and from which a module is physically attachable and detachable;

an electrical connection unit configured to electrically connect the module to the battery when the module is attached to the module attachment and detachment unit;

a traffic acquisition unit configured to acquire traffic information which indicates communication traffic in the wireless communication services provided to the user terminal by the wireless device; and a power control unit configured to control an amount of power supplied from the battery to the module, wherein the power control unit is configured to control the amount of power supplied from the battery to the module according to the communication traffic.

\* \* \* \* \*